US010375647B2

(12) United States Patent
Reial et al.

(10) Patent No.: US 10,375,647 B2
(45) Date of Patent: Aug. 6, 2019

(54) ENERGY-EFFICIENT SOUNDING REFERENCE SIGNAL TRANSMISSION

(71) Applicant: Telefonaktiebolaget LM Ericsson (publ), Stockholm (SE)

(72) Inventors: Andres Reial, Malmö (SE); Fredrik Athley, Kullavik (SE); Andreas Nilsson, Göteborg (SE); Sven Petersson, Sävedalen (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/531,906

(22) PCT Filed: May 18, 2017

(86) PCT No.: PCT/RP2017/061996
§ 371 (c)(1),
(2) Date: May 31, 2017

(87) PCT Pub. No.: WO2018/210425
PCT Pub. Date: Nov. 22, 2018

(65) Prior Publication Data
US 2018/0338289 A1    Nov. 22, 2018

(51) Int. Cl.
*H04W 52/02* (2009.01)
*H04B 17/309* (2015.01)

(52) U.S. Cl.
CPC ...... *H04W 52/0274* (2013.01); *H04B 17/309* (2015.01); *H04W 52/028* (2013.01); *H04W 52/0225* (2013.01)

(58) Field of Classification Search
CPC .................. H04W 72/1226; H04W 52/028
See application file for complete search history.

(56) References Cited

U.S. PATENT DOCUMENTS 6,922,445 B1 * 7/2005 Sampath ............... H01Q 1/246
375/267
2008/0005219 A1 * 1/2008 Nabar .................. H04L 25/0206
709/201

(Continued)

FOREIGN PATENT DOCUMENTS

WO    2010093293 A1    8/2010

OTHER PUBLICATIONS

Qualcomm, Incorporated, "Views on RS for CSI acquisition," 3GPP TSG-RAN WG1 #86bis, Agenda Item, 3.1.4.4, R1-1610151, Oct. 10, 2016, Lisbon, Portugal, pp. 1-5.

(Continued)

*Primary Examiner* — Hsinchun Liao
(74) *Attorney, Agent, or Firm* — Coats & Bennett, PLLC

(57) ABSTRACT

An energy efficient UE 100 comprising a plurality of antenna ports 110 is provided by enabling selective deactivation of at least some transmission chain(s) associated with the antenna port(s) 110 that are not transmitting signals, e.g., SRSs and/or other wireless signals. The UE 100 determines how quickly/how much each channel associated with each antenna port 110 changes, and identifies a subset of antenna ports having a rate of change estimate that satisfies a rate of change requirement as being part of a deactivation subset of antenna ports 110. The UE 100 not only ceases transmitting signals from the antenna ports 110 in the deactivation subset, but also deactivates each of the transmission chains 122 operatively connected to the antenna ports 110 in the deactivation subset. In so doing, the UE 100 eliminates unnecessary power consumption without unduly impacting performance.

44 Claims, 6 Drawing Sheets

(56) References Cited

U.S. PATENT DOCUMENTS

| | | |
|---|---|---|
| 2009/0042616 A1 | 2/2009 | Teo et al. |
| 2011/0096815 A1 | 4/2011 | Shin et al. |
| 2012/0014349 A1 | 1/2012 | Chung et al. |
| 2012/0086608 A1 | 4/2012 | Cathelin et al. |
| 2013/0034066 A1 | 2/2013 | Kakishima et al. |
| 2016/0164580 A1 | 6/2016 | El-Najjar et al. |

OTHER PUBLICATIONS

Qualcomm, Incorporated, "Discussion on SRS Design" 3GPP TSG-RAN WG1 RAN1 NR AdHoc, Agenda Item, 5.1.2.3.4, R1-1700809, Jan. 16-20, 2017, Spokane, USA, pp. 1/2-7/2.

* cited by examiner

Naïve placement of
HW blocks on chip

Thermally robust example
placement of
HW blocks on chip

ENERGY-EFFICIENT SOUNDING REFERENCE SIGNAL TRANSMISSION

TECHNICAL FIELD

The solution presented herein generally relates to controlling wireless transceivers and/or transmissions, and more particularly to selectively reducing power consumption associated with wireless transceivers.

BACKGROUND

Wireless system design, e.g., 5G system design, focuses heavily on energy-efficiency both on the network and the User Equipment (UE) side. Extending battery life is an important objective for most types of wireless devices, from smartphones to IoT devices. Depending on usage scenarios, idle or active mode energy consumption may dominate the overall energy budget. Regardless of the individual UE product scenarios, the UE platform must ensure high energy efficiency in both operating modes to meet operator Key Performance Indicators (KPIs).

Selective transmissions, e.g., transmitting signals from a selected subset of antenna ports of a multi-antenna UE, provide one opportunity for reducing energy consumption for wireless devices. In multi-antenna UEs, multiple antenna ports may be defined for UE channel sounding. In a straightforward solution, for example, all the ports may be included in the sounding process to provide an Access Node (AN) with as much information as possible. In exemplary systems, transmissions from different antenna ports may be multiplexed in time, frequency, or using different time/frequency comb patterns. Some of the antenna ports in the UE may radiate energy towards the serving AN collecting the sounding information, while some others may not. Current discussions in 3GPP standards, e.g., 3GPP R1-1610151 "Views on RS for CSI acquisition," RAN1 #86bis, 14 Oct. 2016, propose allocating Sounding Reference Signals (SRSs) transmission power on a limited number of "good" antenna ports, and omit transmitting SRSs over other antenna ports. For example, the "good" antenna ports may be identified or defined based on Down Link (DL) measurements of the individual antenna ports, dynamically allocated each subframe, and SRS transmissions may be omitted for antenna ports that contribute negligible energy or are unlikely to "reach" the serving AN. Such selective SRS transmission improves transmission power utilization and SRS coverage, and reduces interference in directions other than the target AN.

While the above-described selective SRS transmission reduces the overall transmission power of a device, and thus reduces power consumption, such selective transmission may not sufficiently address or reduce the power consumption of the device. For example, during subframes where certain antenna ports are not transmitting, RF chains of the respective antenna ports are generally still turned on and thus consume energy. Thus, the selective SRS transmission approach improves SRS power allocation and reduces interference, but UE energy efficiency remains suboptimal. Naïve approaches of always turning off transmission components of the RF chains coupled to the inactive antenna ports are not usable in many scenarios because the transient durations required to turning them back on again may be prohibitively long and thus may cause performance degradation. Thus, there remains a need for solutions that improve the battery efficiency of wireless devices.

SUMMARY

The solution presented herein reduces the power consumption, and thus increases the efficiency, of a wireless communication device in communication with an Access Node (AN) of a wireless network, where the wireless communication device comprises a plurality of antenna ports. To that end, the wireless communication device determines how quickly/how much each channel associated with each antenna port changes. The wireless communication device then identifies a subset of antenna ports having a rate of change estimate that satisfies a rate of change requirement as being part of a deactivation subset of antenna ports. This deactivation subset generally includes at least some of the antenna ports that are not transmitting signals, e.g., SRS, but may not include all of such antenna ports. The wireless communication device not only ceases transmitting signals from the antenna ports in the deactivation subset, but also deactivates each of the transmission chains operatively connected to the antenna ports in the deactivation subset. In so doing, the wireless communication device eliminates unnecessary power consumption without unduly impacting performance.

One exemplary embodiment comprises a method, implemented by a wireless communication device, of selectively controlling transmissions from the wireless communication device. The wireless communication device is in communication with an access node of a wireless network. The method comprises receiving a signal at each of a plurality of antenna ports. Each antenna port operatively connects to a reception chain and a transmission chain. Each reception chain comprises a plurality of reception circuits configured to process signals received from the corresponding antenna port. Each transmission chain comprises a plurality of transmission circuits configured to generate a signal for transmission from the corresponding antenna port. The method further comprises processing each received signal to estimate a rate of change for a channel associated with the corresponding antenna port, and defining a deactivation subset of antenna ports as comprising the antenna ports of the plurality of antenna ports having a rate of change estimate that satisfies a transmitter rate of change requirement. The method further comprises deactivating each of the transmission chains operatively connected to the antenna ports in the deactivation subset.

One exemplary embodiment comprises a computer program product for controlling a wireless communication device to selectively control transmissions from the wireless communication device. The wireless communication device is in communication with an access node of a wireless network. The computer program product comprises software instructions which, when run on at least one processing circuit in the wireless communication device, causes the wireless communication device to receive a signal at each of a plurality of antenna ports. Each antenna port operatively connects to a reception chain and a transmission chain. Each reception chain comprises a plurality of reception circuits configured to process signals received from the corresponding antenna port. Each transmission chain comprises a plurality of transmission circuits configured to generate a signal for transmission from the corresponding antenna port. The software instructions, when run on the processing circuit(s), further cause the wireless communication device to process each received signal to estimate a rate of change for a channel associated with the corresponding antenna port, and define a deactivation subset of antenna ports as comprising the antenna ports of the plurality of antenna ports having a rate of change estimate that satisfies a transmitter rate of change requirement. The software instructions, when run on the processing circuit(s), further cause the wireless communication device to deactivate each of the transmission chains operatively connected to the antenna ports in the deactivation subset.

One embodiment comprises a wireless communication device configured to selectively control transmissions from the wireless communication device. The wireless communication device is in communication with an access node of a wireless network. The wireless communication device comprises a plurality of antenna ports, an analysis circuit, and a deactivation circuit. Each of the plurality of antenna ports operatively connects to a reception chain and a transmission chain. Each reception chain comprises a plurality of reception circuits configured to process signals received from the corresponding antenna port. Each transmission chain comprises a plurality of transmission circuits configured to generate a signal for transmission from the corresponding antenna port. The analysis circuit operatively connects to each reception chain and each transmission chain, and is configured to process each signal received by a corresponding antenna port to estimate a rate of change for a channel associated with the corresponding antenna port. The deactivation circuit operatively connects to the analysis circuit and to each reception and transmission chain. The deactivation circuit is configured to define a deactivation subset of antenna ports as comprising the antenna ports of the plurality of antenna ports having a rate of change estimate that satisfies a transmitter rate of change requirement. The deactivation circuit is further configured to deactivate each of the transmission chains operatively connected to the antenna ports in the deactivation subset.

One embodiment comprises a wireless communication device configured to selectively control transmissions from the wireless communication device. The wireless communication device is in communication with an access node of a wireless network. The wireless communication device comprises a plurality of antenna ports, an analysis module, and a deactivation module. Each of the plurality of antenna ports operatively connects to a reception chain and a transmission chain. Each reception chain comprises a plurality of reception modules configured to process signals received from the corresponding antenna port. Each transmission chain comprises a plurality of transmission modules configured to generate a signal for transmission from the corresponding antenna port. The analysis module operatively connects to each reception chain and each transmission chain, and is configured to process each signal received by a corresponding antenna port to estimate a rate of change for a channel associated with the corresponding antenna port. The deactivation module operatively connects to the analysis module and to each reception and transmission chain. The deactivation module is configured to define a deactivation subset of antenna ports as comprising the antenna ports of the plurality of antenna ports having a rate of change estimate that satisfies a transmitter rate of change requirement. The deactivation module is further configured to deactivate each of the transmission chains operatively connected to the antenna ports in the deactivation subset.

DETAILED DESCRIPTION

Figure 1:
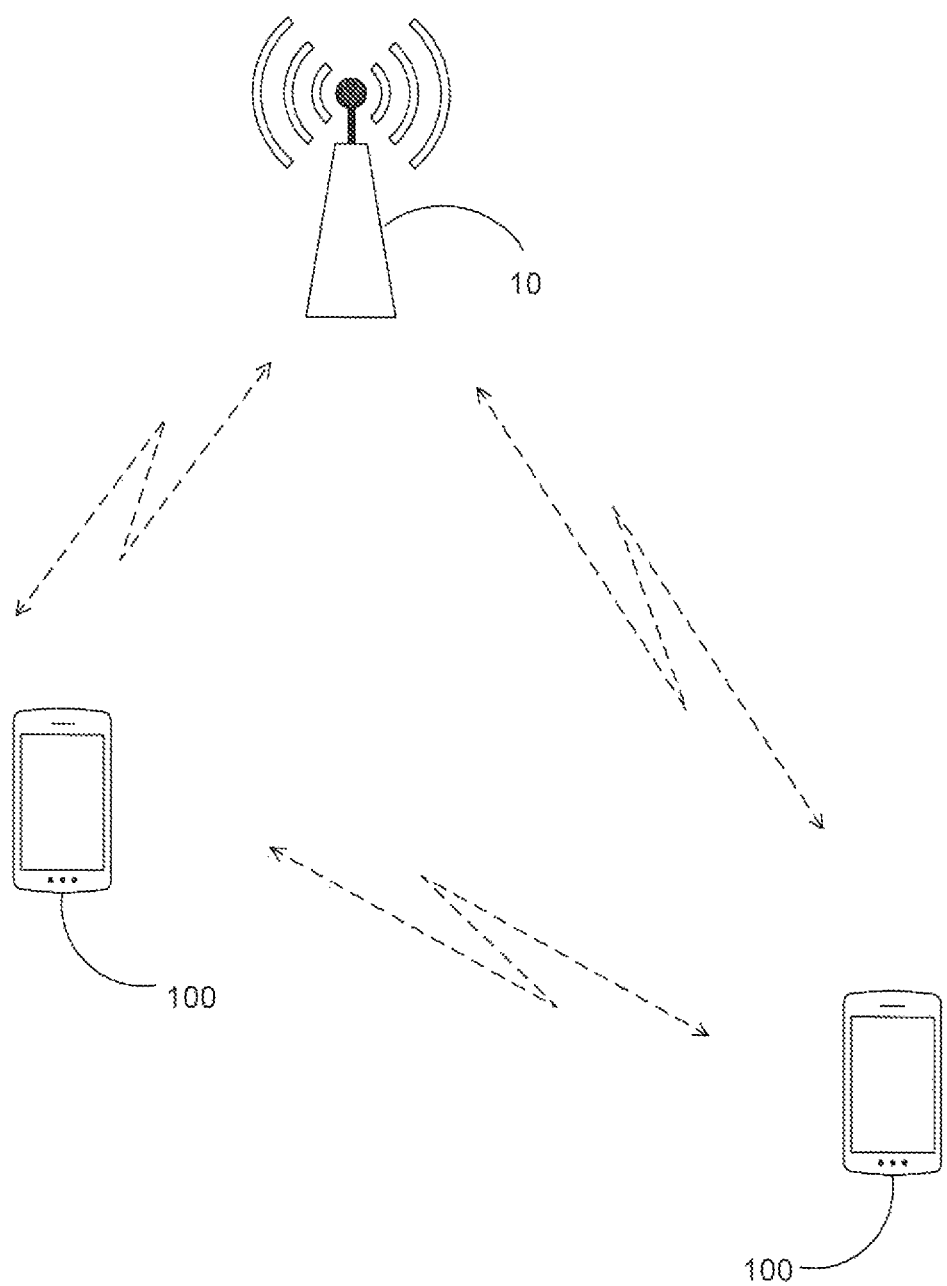
FIG. 1 shows an exemplary wireless network comprising an access node in communication with wireless communication devices.

FIG. 1 shows an exemplary wireless network comprising an Access Node (AN) 10 in communication with multi-antenna wireless communication devices 100, were each antenna port of the wireless communication device 100 is coupled to a transmission chain (to process signals for transmission by the antenna port) and a reception chain (to process signals received by the antenna port). It will be appreciated that the solution presented herein applies to any wireless network operating according to wireless communication standards to enable the wireless communication device 100 to send/receive UpLink (UL)/DownLink (DL) signals to/from the AN 10, and/or to enable one wireless communication device 100 to send/receive signals to/from another wireless communication device 100. In the context of the solution presented herein, it should be understood that AN 10 may comprise any radio network node providing downlink communications to a wireless communication device 100, e.g., a radio base station, NB, eNB, gNB, etc. Exemplary wireless communication devices 100 comprise, but are not limited to, a machine-to-machine (M2M) device, a machine-type communications (MTC) device, and/or a Narrowband Internet of Things (NB-IoT) device. The wireless communication device 100 may also comprise a User Equipment (UE), however it should be noted that the UE does not necessarily have a "user" in the sense of an individual person owning and/or operating the device. A wireless communication device 100 may also be referred to as a radio device, a radio communication device, a wireless terminal, or simply a terminal. Unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, mobile phones, smart phones, laptop-embedded equipped (LEE), laptop-mounted equipment (LME), USB dongles, wireless customer-premises equipment (CPE), etc. In the discussion herein, the terms M2M device, MTC device, wireless sensor, and sensor may also be used. It should be understood that these devices may be UEs, but are generally configured to transmit and/or receive data without direct human interaction. In an IoT scenario, a wireless communication device 100 as described herein may be, or may be comprised in, a machine or device that performs monitoring or measurements, and transmits the results of such monitoring measurements to another device or a network. Particular examples of such machines are power meters, industrial machinery, or home or personal appliances, e.g., refrigerators, televisions, personal wearables such as watches etc. In other scenarios, a wireless communication device 100 as described herein may be comprised in a vehicle and may perform monitoring and/or reporting of the vehicle's operational status or other functions associated with the vehicle.

The solution presented herein improves the power efficiency of a wireless communication device 100 by selectively deactivating one or more of the transmission chains. Before providing specific details of the solution, the following first provides a general discussion about channel sounding and UpLink (UL) scheduling.

In cellular networks, successful data transmission and reception relies on the receiver having sufficient channel knowledge. In some cases, such channel knowledge is also useful to the transmitter. To demodulate and decode a received data packet, the receiver obtains a demodulation phase reference for each antenna port or precoded layer, which may be provided by DeModulation Reference Signals (DMRSs) embedded in a transmitted DL data signal, or by Sounding Reference Signals (SRSs) in an UL signal. To determine the appropriate layer selection, rate selection, and precoding, the transmitter needs information ahead of time about channel properties for the different antenna ports that could be used for transmission. In legacy systems, this Channel State Information (CSI) for UL scheduling is provided by the UL SRS. CSI for DL scheduling is obtained when UEs perform DL measurements on candidate DL Reference Signals (RSs) or antenna port combinations and provide limited feedback in the UL.

In advanced Time Division Duplexing (TDD) systems that support UL/DL reciprocity at the AN 10, the SRSs transmitted by one or more UEs for UL scheduling may also be used for DL transmission scheduling and precoding. This use of the SRSs makes more complete channel information available to the transmitter and enables advanced precoding solutions, e.g., massive Multi-User Multiple-Input-Multiple-Output (MU-MIMO) transmissions.

UE 100 transmits the SRS to allow AN 10 to estimate the UL channel for UL scheduling, as well as for DL scheduling and precoding estimation in the reciprocity-based massive MIMO setting. For UL, UE 100 may use the SRS for channel sounding as part of Channel State Information (CSI) acquisition at a receiver of the AN 10. For example, when a receiver at the AN 10 receives the SRS from the UE 100, the AN 10 processes the received SRS to estimate the CSI for the channel. The AN 10 may then transmit the CSI to the UE 100. For DL, the CSI for transmitting at the AN 10 is extracted from a coherent (UL) SRS, thereby obviating the need for explicit CSI feedback based on DL reference signals. The SRSs used for channel sounding may be transmitted in subframes carrying uplink physical channels (as in Long Term Evolution (LTE)), as well as in subframes specifically designed for sounding only.

Figure 2:
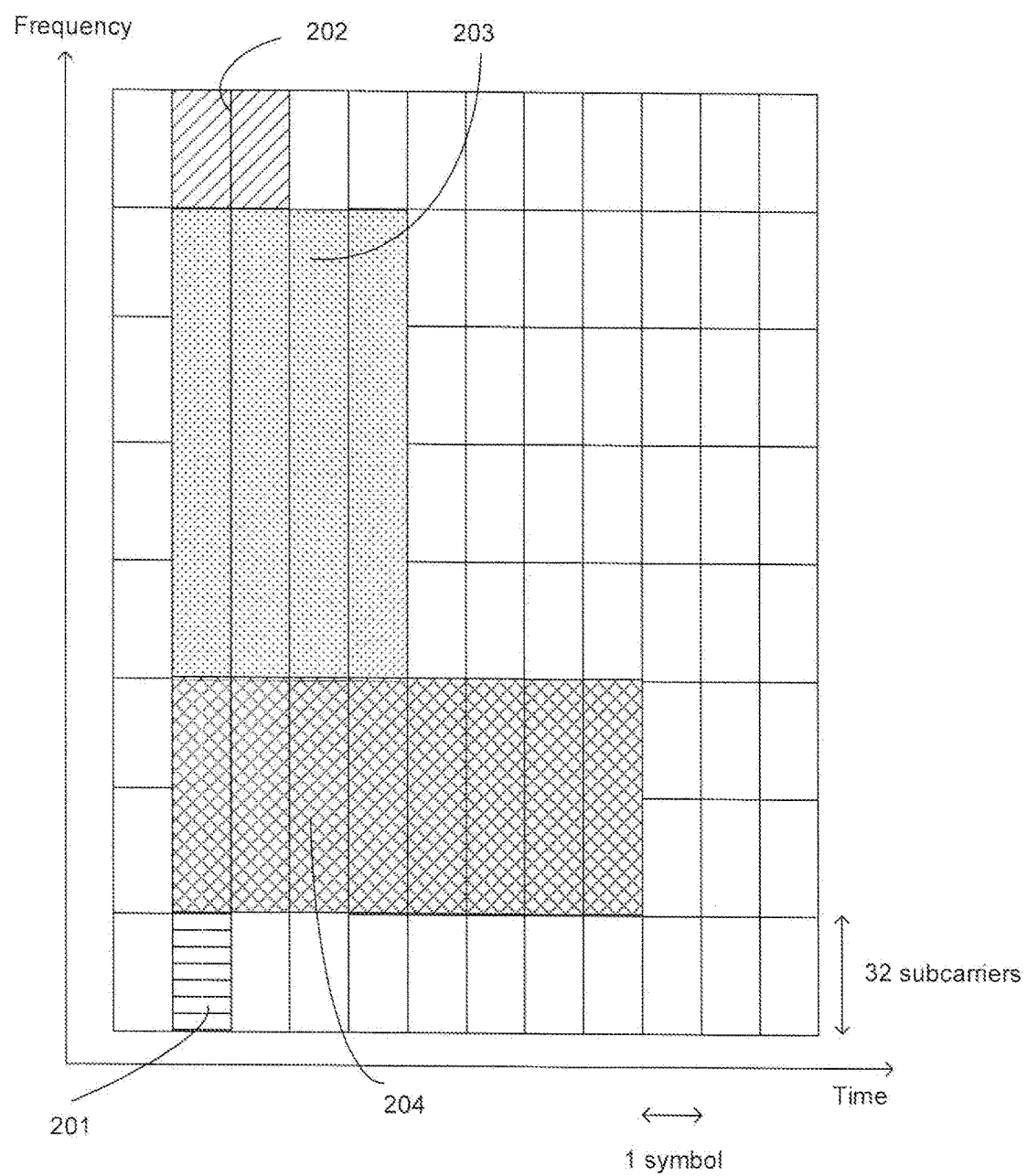
FIG. 2 shows the utilization of different orthogonality mechanisms in different parts of a transmission band.

The SRS is configured to provide a large number of orthogonal sequences, or at least a large number of sequences with very low mutual cross-correlation. Sets of orthogonal SRSs may be configured using combinations of, e.g., cyclic shifting (CS), transmission combs (or interleaving), and orthogonal cover codes (OCCs). FIG. 2 shows how these different orthogonality mechanisms may be utilized, and how the different combinations can be simultaneously applied in different parts of the transmission band.

In particular, FIG. 2 provides multiple examples 201, 202, 203, 204 for different othogonality mechanisms. In example 201, the assignment of 32 subcarriers during one symbol accommodates eight length-32 SRS sequences that constitute different 4-subcarrier cyclic shifts of an underlying sequence. The span of SRS in time and frequency can be increased by expanding the SRS bandwidth (number of subcarriers) and applying comb patterns that interleave segments of multiple SRS sequences, or by allocating more Orthogonal Frequency Division Multiplexing (OFDM) symbols and using OCC to spread multiple SRS sequences over a longer time period. In example 202, there may be 16 SRSs assigned over 32 subcarriers and two symbols. In example 203, there may be 128 SRSs assigned over 128 subcarriers and four symbols. In example 204, there may be 128 SRSs assigned over 64 subcarriers and eight symbols.

As noted above, SRS transmissions may be limited to some number of "good" antenna ports, fewer than the total number of antenna ports available to the UE 100, where the remaining antenna ports do not transmit any SRSs, and thus are inactive. For example, the UE 100 may eliminate transmissions over antenna ports that contribute negligible energy and/or are unlikely to reach the AN 10. Such selective SRS transmission improves SRS power allocation and reduces interference. Even when the UE 100 eliminates the transmissions from such antenna ports, however, the transmission and/or reception chains associated with each antenna port are still active, and thus still consume energy. As such, conventional solutions still result in suboptimal energy efficiency at the UE 100.

The solution presented herein improves the energy efficiency of the UE 100 by enabling selective deactivation of at least some transmission chains associated with the antenna port(s) that are not transmitting signals, e.g., SRSs and/or other wireless signals. As such, the solution presented herein addresses the fact that turning Radio Frequency (RF) hardware associated with inactive antenna ports on/off incurs delays and signal settling times, as well as additional energy consumption due to transients and possible interface configurations at power-ON. Thus, simply turning off any RF hardware associated with an inactive antenna port is not a universally optimal solution. The solution presented herein improves efficiency, by deactivating RF hardware, e.g., transmission chain(s), responsive to the current rate of channel change associated with the corresponding antenna port(s).

Figure 3:
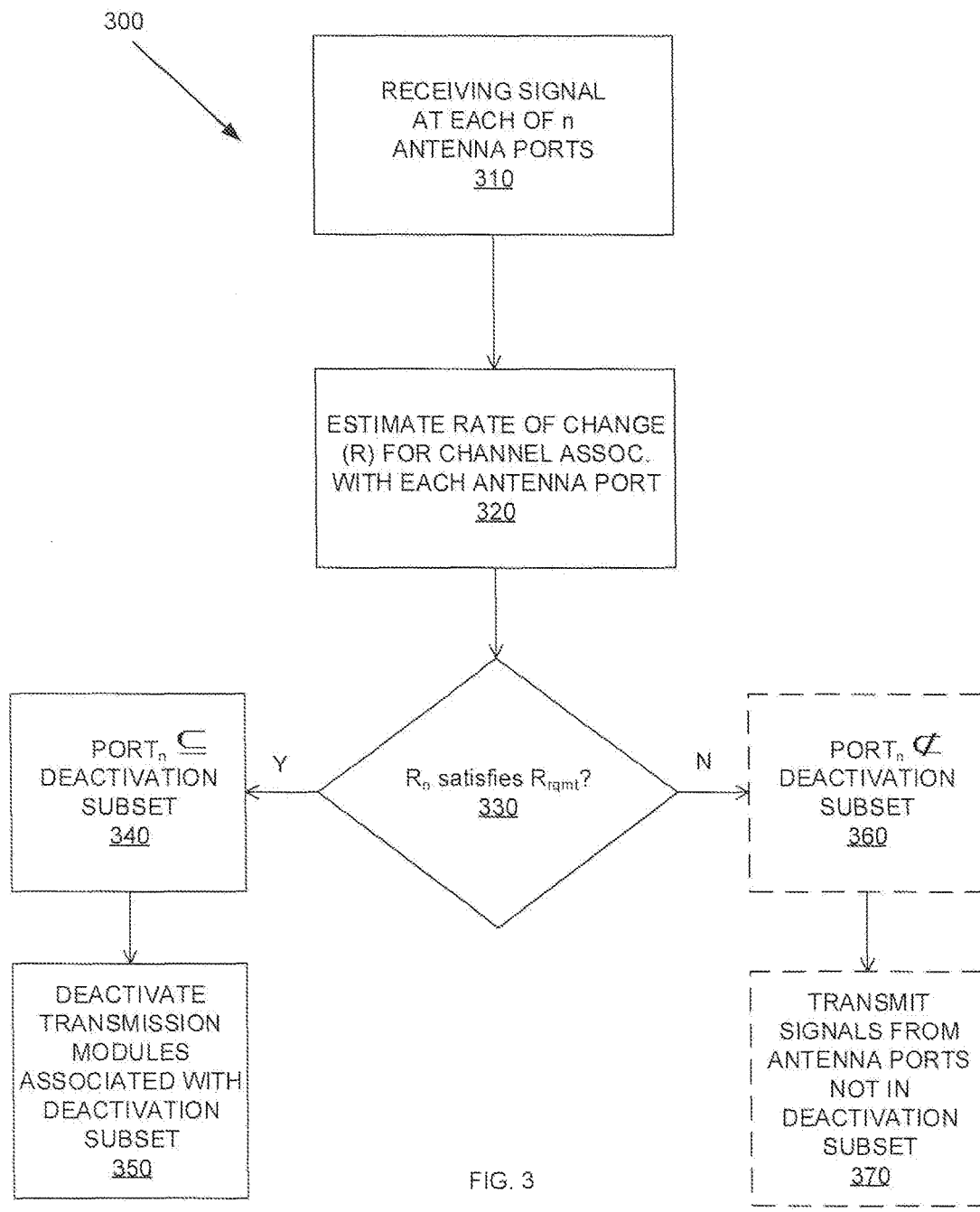
FIG. 3 shows a method implemented by the wireless communication device according to one exemplary embodiment.
Figure 4:
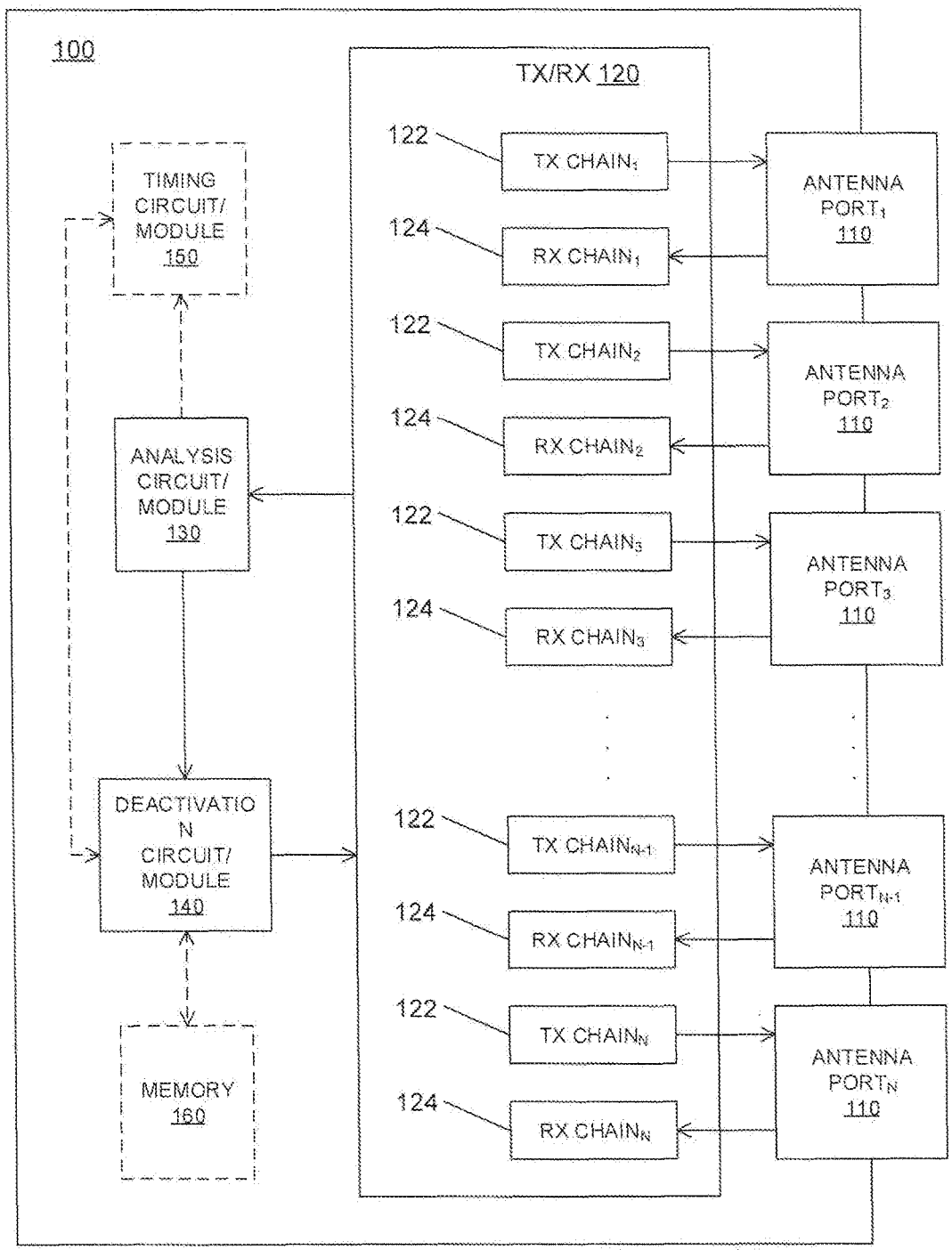
FIG. 4 shows a block diagram of a wireless communication device according to one exemplary embodiment.

FIG. 3 shows one exemplary method 300 implemented by a wireless communication device 100, e.g., the wireless communication device 100 of FIG. 4, for selectively controlling transmissions from the wireless communication device 100. Device 100 receives a signal at each of a plurality of the n=1, 2, ..., N antenna ports 110, where each antenna port 110 operatively connects to a reception chain 124 and a transmission chain 122 (block 310). The device 100 processes each signal received by an active antenna port 110 to estimate a rate of change $R_n$ for a channel associated with the corresponding antenna port 110 (block 320), and determines which of the rate of channel change estimates, if any, satisfies a rate of change requirement $R_{rqmt}$ (block 330). A deactivation subset is defined (block 340) as comprising antenna ports 110 having a rate of channel change estimate that satisfies the rate of change requirement (block 330). The wireless communication device 100 then deactivates each of the transmission chains operatively connected to an antenna port 110 in the deactivation subset (block 350). Some number or all of the remaining antenna ports 110 are defined as not being part of the deactivation subset (optional block 360). The wireless communication device 100 may use any antenna ports 110 not in the deactivation subset to transmit signals (optional block 370). In one exemplary embodiment, the antenna ports 110 not in the deactivation subset may be used to transmit reference signals. Alternatively or additionally, the antenna ports 110 not in the deactivation subset may be used to transmit data signals.

Figure 5A:
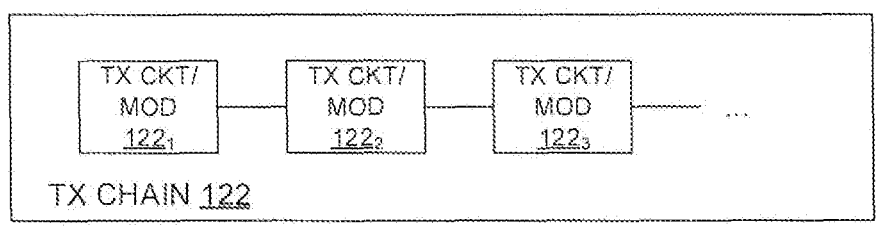
FIG. 5A shows a block diagram of one exemplary transmission chain for the wireless communication device of FIG. 4.
Figure 5B:
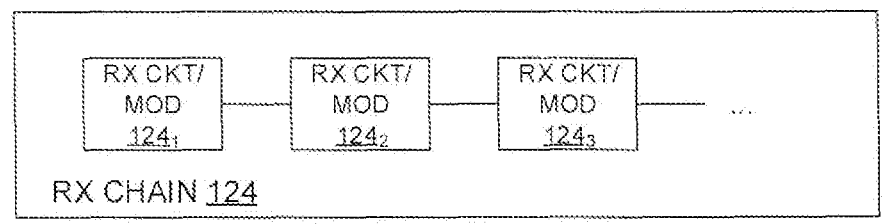
FIG. 5B shows a block diagram of one exemplary reception chain for the wireless communication device of FIG. 4.

FIG. 4 shows an exemplary wireless communication device 100 configured to implement the method 300 of FIG. 3. Device 100 comprises a plurality of antenna ports 110, e.g., n=1, 2, . . . , N antenna ports 110, a transceiver 120, an analysis circuit/module 130, and a deactivation circuit/module 140. Transceiver 120 comprises one transmission chain 122 and one reception chain 124 for each antenna port 110. As shown in FIG. 5A, each transmission chain 122 includes a plurality of transmission circuits/modules $122_1$, $122_2$, . . . . Exemplary transmission circuits/modules $122_1$, $122_2$, . . . include, but are not limited to, filters, amplifiers, mixers, etc. As shown in FIG. 5B, each reception chain 124 includes a plurality of reception circuits/modules $124_1$, $124_2$, . . . . Exemplary reception circuits/modules $124_1$, $124_2$, . . . include, but are not limited to, filters, amplifiers, mixers, etc.

Each active antenna port 110 receives a signal, where the corresponding reception chain 124 processes the received signal. The number of active antenna ports 110 may comprise all of the device's antenna ports 110 or some subset of the device's antenna ports 110. Analysis circuit/module 130 processes each received signal to estimate a rate of change $R_n$ for a channel associated with the corresponding antenna port 110. The deactivation circuit/module 140 determines which of the rate of change estimates, if any, satisfies a rate of change requirement $R_{rqmt}$. Deactivation circuit/module 140 defines the deactivation subset as comprising antenna ports 110 having a rate of change estimate that satisfies the rate of change requirement, and deactivates each of the transmission chains 122 operatively connected to an antenna port 110 in the deactivation subset. The transmission chain(s) 122 associated with antenna elements 110 in the deactivation subset may be deactivated for reference signal transmission, e.g., SRS transmission, as well as data transmissions during the SRS off period. Some number or all of the antenna ports 110 that do not satisfy the rate of change requirement are optionally defined by the deactivation circuit/module 140 as not being part of the deactivation subset. Data and/or reference signals may thus be transmitted by the antenna ports 110 that are not in the deactivation subset.

The analysis circuit/module 130 may process any received reference signal or other control or data signals to estimate a rate of change $R_n$ for a channel associated with the corresponding antenna port 110. Exemplary reference signals include, but are not limited to, a Primary Synchronization Signal and/or Secondary Synchronization Signal (PSS/SSS), a Mobility Reference Signal (MRS), a Beam Reference Signal (BRS), a Demodulation Reference Signal (DMRS), a Channel State Information Reference Signal (CSI-RS), etc. The rate of channel change may be estimated, for example, from a Doppler estimate. Alternatively, the rate of channel change may be estimated based on internal sensors or a GPS receiver. It will be appreciated that the rate of channel change estimated based on received reference signals could also be used to account for rapid channel changes that occur when the device 100 is not moving, e.g., blocking/unblocking antenna ports 110 by the user's hand, body part, or other object. As discussed further herein, analysis circuit/module 130 may also process received signals to evaluate signal strength and/or any other signal quality metrics, e.g., Signal-to-Noise Ratio (SNR), Signal-to-Interference-plus-Noise Ratio (SINR), etc., which may be further used to identify which antenna ports 110 should be deactivated and/or which transmission chain(s) 122 should be deactivated.

The deactivation circuit/module 140 defines the deactivation subset as comprising antenna ports 110 having a rate of change estimate that satisfies a transmitter rate of change requirement. Because the requirements for determining which transmission chains 122 to deactivate are typically more stringent than the requirements for determining which antenna ports 110 to deactivate, the number of antenna ports 110 in the deactivation subset may be less than or equal to the number of inactive antenna ports 110. Generally, the deactivation circuit/module 140 should not include any antenna port 110 in the deactivation subset associated with a propagation channel that changes so quickly that the relevant antenna port 110 would need to be turned on again after a relatively short period of time, e.g., for the next SRS transmission cycle. It will be appreciated that the rate of channel change is used herein as a general term to characterize how fast the channel varies. The rate of channel change may be expressed in terms of traditional Doppler spread estimated for the channel, the slope of the channel magnitude or power trajectory over time, the number of zero crossings of the real/imaginary component of the channel estimate, the estimate of the channel coherence time based on filtering, etc. Thus, for one exemplary embodiment, the transmitter rate of change requirement may comprise a threshold, e.g., a threshold defining a maximum rate of channel change that can be tolerated before it is no longer feasible to deactivate the corresponding transmission chain 122. In this example, each antenna port 110 having a rate of change estimate less than the threshold satisfies the rate of change requirement, and thus is placed in the deactivation subset. In another embodiment, the threshold may define a minimum channel coherence time required to deactivate the corresponding transmission chain 122. In yet another embodiment, the threshold may define the transmitter rate of change requirement as a maximum Doppler spread permitted to deactivate the corresponding transmission chain 122. Other exemplary embodiments may define the transmitter rate of change requirement as a maximum permissible slope or the maximum permissible number of zero crossings. In any event, the deactivation circuit/module 140 may determine the appropriate threshold responsive to the coherence time of the channel and/or the transient timing of the transmission chain 122, e.g., the longest transient timing of any one of the components in the transmission chain 122. The transient timing may also include any decision processing and on/off signaling delays between a control unit (e.g., circuits/modules 130, 140, 150) and the antenna ports 110 in the device 100. For example, the deactivation circuit/module 140 may define the threshold as a time that is at least as long as a DL measurement and the corresponding transmission chain on/off decision cycle length.

In one exemplary embodiment, the deactivation circuit/module 140 deactivates the transmission chains 122 operatively connected to antenna port(s) 110 in the deactivation subset by deactivating each transmission circuit/module $122_1$, $122_2$, . . . in each transmission chain 122 operatively connected to the antenna port(s) 110 in the deactivation subset. In another exemplary embodiment, however, the deactivation circuit/module 140 deactivates the transmission chains 122 operatively connected to the antenna port(s) 110 in the deactivation subset by deactivating some number of transmission circuits/modules $122_1$, $122_2$, . . . in each transmission chain 122 operatively connected to the antenna port(s) 110 in the deactivation subset. For example, the deactivation circuit/module 140 may deactivate any of the transmission circuits/modules $122_1$, $122_2$, . . . that exceed a threshold power consumption or contribute more than a specified amount to interference, where the threshold/specified amount of interference may be selected as some percentage of the total power consumption. It will be appreciated that if even one circuit/module $122_1$, $122_2$, . . . of a transmission chain 122 is deactivated, that transmission chain 122 is considered to be deactivated. For example, a transmission chain 122 is considered to be deactivated if the power amplifier(s) in that transmission chain 122 is/are deactivated, even if other components, e.g., a mixer, filter, etc., remain active. The subset of transmission circuits/modules $122_1$, $122_2$, . . . that are to be deactivated by the deactivation circuit/module 140 may be defined in advance, or may be selected by the deactivation circuit/module 140 responsive to the estimated rate of change for the channel. In so doing, the deactivation circuit/module 140 is able to store, e.g., in memory 160, the transient durations associated with turning on particular transmission circuits/modules $122_1$, $122_2$, . . . relative to how quickly the channel is currently changing, and thus can reduce the impact of deactivating the transmission chain(s) 122, e.g., thus can reduce the inability to transmit signals at sufficiently low latency or degradation of transmitted signal due to unstable state of the circuitry during the transient interval.

The deactivation circuit/module 140 may optionally control how long each transmission chain 122 operatively connected to the antenna port(s) 110 in the deactivation subset is deactivated. For example, deactivation circuit/module 140 may keep one or more of the transmission chains 122 operatively connected to the antenna port(s) 110 in the deactivation subset deactivated for a predetermined amount of time, e.g., multiple transmission periods and/or until it is time to check the downlink signal quality again when the rate of channel change is sufficiently slow. Upon expiration of that predetermined amount of time, the deactivation circuit/module 140 may reactivate one or more of the deactivated transmission chains 122 and/or may reevaluate to see if one or more of these transmission chains 122 should remain deactivated. Optionally, the wireless communication device 100 may include a timing circuit/module 150 that determines a time limit, and provides the determined time limit to the deactivation circuit/module 140. The deactivation circuit/module 140 uses the provided time limit to define how long the corresponding transmission chain 122 should be deactivated before being reactivated or before the channel is reevaluated. In one exemplary embodiment, the timing circuit/module 150 determines the time limit responsive to the rate of change estimates and/or a transient time associated with the transmission chain(s) 122 operatively connected to the antenna port(s) 110 in the deactivation subset. For example, because the rate of channel change estimate provides an estimate of the channel coherence time, the timing circuit/module 150 may define the time limit as some amount of time less than the channel coherence time. It will be appreciated that the deactivation circuit/module 140 may enact this control individually or for all transmission chains 122 collectively. For example, the deactivation circuit/module 140 may apply the same deactivation time limit to each deactivated transmission chain 122. Alternatively, the deactivation circuit/module may use a time limit individually specified for each transmission chain 122 to separately control the deactivation duration for each deactivated transmission chain 122.

While the above describes the solution in terms of the estimated rate of change for each channel, the solution presented herein may also consider the signal quality when determining which antenna ports 110 should be included in the deactivation subset. For example, the deactivation circuit/module 140 may identify an initial subset of antenna ports 110 as those antenna ports 110 that fail a signal quality requirement, e.g., those antenna ports 110 having a signal quality less than a minimum required signal quality. For example, those antenna ports 110 having a signal quality below an absolute threshold, or below a relative threshold related to the best port or average port quality, may be excluded from active transmissions, and thus may be identifies as part of the initial subset of antenna ports 110. Alternatively or additionally, the initial subset of antenna ports 110 may include some predetermined number of the weakest antenna ports 110. In some embodiments, the antenna ports 110 in the initial subset may be deactivated. The deactivation circuit/module 140 may then define the deactivation subset as comprising those antenna ports 110 in the initial subset that have a rate of channel change estimate satisfying a rate of change requirement. Thus, this embodiment uses a more stringent requirement (the rate of channel change) to determine which transmission chains 122 should be deactivated than used to determine which antenna ports 110 should be deactivated.

The solution presented herein may be further extended to consider deactivating one or more of the receiver chains 124 operatively connected to the antenna ports 110. As with the transmission chain deactivation, the deactivation circuit/module 140 may consider the rate of channel change estimate for each antenna port 110 when determining whether to include a particular antenna port 110 in a receiver deactivation subset. For example, the deactivation circuit/module 140 may define the receiver deactivation subset as comprising the antenna ports 110 having a rate of channel change estimate that satisfies a receiver rate of change requirement. The receiver rate of change requirement may be the same as the transmitter rate of change requirement. In this case, the deactivation circuit/module 140 may simply define the receiver deactivation subset as comprising the same antenna ports 110 as the transmitter deactivation subset. It will be appreciated, however, that such is not required. In general, the criteria for determining which receiver chains 124 to deactivate may be less aggressive/more stringent than the criteria for determining which transmitter chains 122 to deactivate because the receiver chains 124 are more likely to be needed, e.g., to analyze the DL quality for the associated antenna ports 110. As such, the receiver rate of change requirement may be different from the transmitter rate of change requirement. For example, the deactivation circuit/module 140 may require the rate of change for receiver chain deactivation to be slower than required for transmitter chain deactivation. In any event, the deactivation circuit/module 140 deactivates the receiver chain(s) 124 operatively connected to the antenna port(s) 110 in the receiver deactivation subset.

As with the deactivated transmitter chains 122, the deactivation circuit/module 140 may control the duration of the deactivation of any deactivated receiver chains 124, e.g., according to a time limit determined by the timing circuit/module 150 or according to some predetermined and/or fixed time limit. As such, the deactivation circuit/module 140 may reactivate any receiver chain 124 after expiration of any predetermined or determined time limit. Alternatively, the deactivation circuit/module 140 may reevaluate the channel to determine which, if any, of the deactivated receiver chains 124 should remain deactivated. It will be appreciated that the deactivation circuit/module 140 is not required to use the same time limit for the deactivated transmitter chains 122 and the receiver chains. In exemplary embodiments, the time limit for receiver chain deactivation will be shorter than the time limit for the transmitter chain deactivation to enable the receiver chain 124 to evaluate the DL signal quality before the channel changes significantly.

According to additional exemplary embodiments, the deactivation circuit/module 140 may further consider thermal considerations when determining which antenna ports 110 to include in the transmitter and/or receiver deactivation subsets. To explain this embodiment, consider that at higher frequency bands, e.g., mmW, many transmitter chains 124, including the associated power amplifiers, will be integrated on the same chip or die. If a group of transmitter chains 124 are turned off in a given region of the chip or die, there could be large temperature gradients across the chip. Different active transmitter/receiver chains may have significantly different temperatures, and thus the thermal tracking will be partly lost, e.g., the gain may differ between transmitter chains 124, which in turn will negatively impact the precoding weights.

Figure 6A:
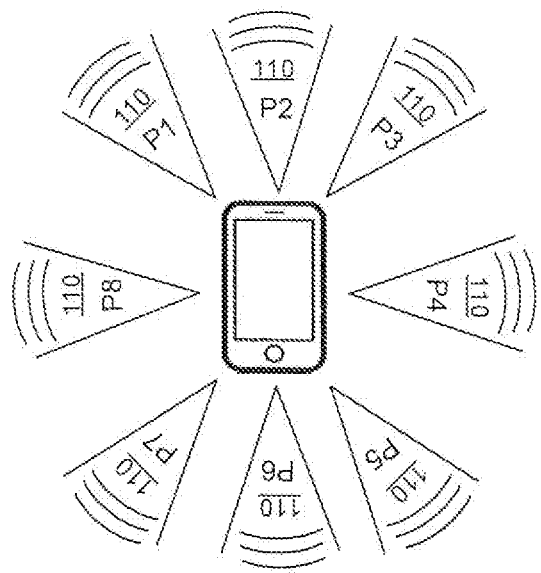
FIGS. 6A-6C show exemplary transmission chain placement on a chip of the wireless communication device.
Figure 6B:
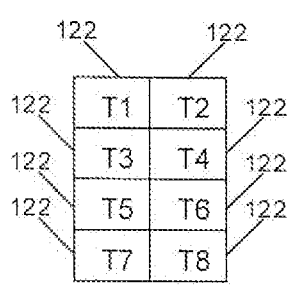
Figure 6C:
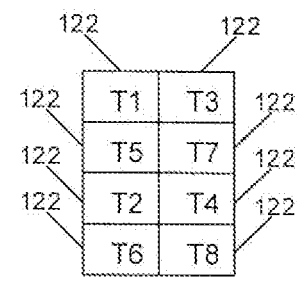

According to the solution presented herein, the deactivation circuit/module 140 may consider these thermal issues. In particular, because the thermal impact of turning off two or more transmission chains 122 (and/or reception chains 124) depends on how these chains are distributed on the chip/die, deactivating and/or reactivating transmission chains 122 predominantly only in one corner/side of the chip/die containing multiple transmission chains 122 could be problematic. One solution to this problem is to assemble the antenna ports 110 and corresponding transmission chains 122, to the extent possible, on the chip/die such that adjacent transmission chains 122 do not connect to adjacent antenna ports 110. FIGS. 6A-6C show one example, where FIG. 6A shows an exemplary wireless communication device 100 with eight antenna ports 110 (P1, P2, . . . , P8). FIG. 6B shows a general placement of the corresponding transmission chains 122 (T1, T2, . . . , T8) on the die, without any consideration to the consequences for deactivating the transmission chains 122 for adjacent antenna ports 110. FIG. 6C, however, shows how the transmission chains 110 (T1, T2, . . . , T8) for each antenna port 110 instead could be placed on the chip/die such that adjacent transmission chains 122 on the chip/die do not connect to adjacent antenna ports 110 on the device 100, which helps avoid some of the negative thermal consequences. As such, in the likely scenario where adjacent antenna ports 110 are deactivated, the placement shown in FIG. 6C makes it less likely that adjacent transmission chains 122 will also be deactivated. In some embodiments, a preferred allocation of the transmission chains 122 on the chip/die has an interleaved character, ensuring that signals received or transmitted by nearby and/or adjacent antenna ports 110 are processed in separate regions of the chip or die. This interleaved character may be achieved by random or regular mapping patterns, where the primary goal is to avoid systematic mapping of large groups of transmission chains 122 for nearby antenna ports 110 to the same region of the chip or die. Alternatively or additionally, the deactivation circuit/module 140 may consider the placement of the transmission chains 122 operatively connected to the antenna ports 110 in the deactivation subset before making a final determination as to whether to deactivate such transmission chains 122. For example, the deactivation circuit/module 140 may define the deactivation subset as comprising those antenna ports 110 that satisfy the rate of channel change requirement and that are operatively connected to non-adjacent transmission chains 122. While FIGS. 6A-6C show a two-dimensional view, it will be appreciated that the solution may easily be extended to three dimensions. Further, while FIGS. 6A-6C demonstrate various chip placements for the transmission chains 122, it will be appreciated the same may be done/considered for the reception chains 124.

As shown, device 100 executes the method 300 of FIG. 3 using various functional means, units, circuits, or modules, e.g., one or more processing circuits such as the analysis circuit/module 130 and the deactivation circuit/module 140, and optionally the timing circuit/module 150. Those skilled in the art will also appreciate that embodiments herein further include corresponding computer programs. A computer program comprises instructions which, when executed on at least one processor of a node, cause the node to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium. In this regard, embodiments herein also include a computer program product stored on a non-transitory computer readable (storage or recording) medium and comprising instructions that, when executed by a processor of a node, cause the node to perform as described above.

Embodiments further include a computer program product comprising program code portions for performing the steps of any of the embodiments herein when the computer program product is executed by a computing device. This computer program product may be stored on a computer readable recording medium, e.g., a non-transitory computer readable medium.

In general, any deactivated transmission chain 122 is associated with a deactivated antenna port 110. It will be appreciated, however, that the number of deactivated transmission chains 122 may be the same as or less than the number of deactivated antenna ports 110. In particular, the determination of whether to deactivate an antenna port 110 may be based on any number of circumstances, e.g., signal quality (e.g., low signal quality at a particular antenna port 110 may indicate the antenna port 110 may be deactivated), whether the device 100 is configured for UL measurement-based mobility (in which case, no antenna ports 110 should be deactivated), needed data rate (e.g., if rank-one transmission provides a sufficiently high data rate, the device may only need to sound one antenna port 110), the rate of channel change (if the channel is changing too quickly, the antenna port 110 should not be deactivated, etc. However, because of the potential delays and transients caused by turning RF hardware on/off, the determination of whether to deactivate RF hardware associated with a deactivated antenna port 110, e.g., the transmission chain 122 and/or the reception chain 124, may be more stringent. Per the solution presented herein, the rate of channel change represents the key parameter for determining whether to deactivate the RF hardware (and which RF hardware to deactivate) because the coherence time, relative to the time required to deactivate and reactivate any one or more RF hardware component, dictates whether the RF hardware can be deactivated and reactivated without adversely impacting performance.

The solution presented herein applies to any wireless communication device 100 having multiple antenna ports 110, but most directly applies to devices 100 where different antenna ports 110 correspond to individual antenna elements, e.g., device designs where multiple antenna elements are not arranged in regular arrays with uniform transmission patterns. Because irregular antenna array designs preclude creation of predictable beam shapes, beam sweep or SRS transmission from different antenna ports 110 often amounts to transmitting orthogonal SRS from different antenna ports 110, which in aggregate approximate an omni-directional or some other at least partially uniform radiation pattern. The solution presented herein is most relevant for, but is not limited to, scenarios where the device 100 is exchanging data with a single AN 10, where there is a single transmission/reception location that the device 100 should cover, while transmission in other directions is unnecessary or should actively be avoided.

The solution presented herein improves energy efficiency by reducing the number of active transmission chains on average. As a result, the solution presented herein extends the battery life of the wireless communication device, particularly when the wireless communication device spends a significant amount of time in active mode, e.g., transmitting data. This improvement may be significant, particularly for some device designs, e.g., those that place the antenna ports 110 on multiple sides of the device 100 to enable the UE to cover an approximately isotropic spatial range. In this case, there are several scenarios where up to 50% of the antenna ports 110 may be turned off because they are not useful due to high or higher attenuation towards any network node 10, e.g., when the device 100 is in a user's pocket with one side facing the body or when the device 100 is on a table with one side facing the surface. By recognizing when the transmission chains 122 and/or reception chains 124 associated with such inactive antenna ports 110 may be deactivated, and by deactivating the transmission chain(s) 122 and/or reception chain(s) 124 during these times, the solution presented herein saves considerable battery power. Further, embodiments that control how long each transmission chain 122 is turned off, e.g., with a time limit determined by the timing circuit/module 150, enable the transmission chains 122 to be turned off for specified periods of time without the processing required to continuously monitor the downlink signals and adapt the deactivation subset. For example, if the time limit is long enough, and if the AN 10 is aware of the time limit, the AN 10 may be able to adapt the number of SRS ports that the device 100 will be scheduled for. With fewer SRS ports, there will be more power per SRS, which improves the channel estimation of the SRS ports at the AN 10, as well as reduces the amount of overhead signaling due to the fact that more SRS ports require larger codebooks, and thus longer PMIs. Further still, by intelligently placing the transmission chains 122 and/or reception chains 124 on the chip/die, e.g., in an interleaved fashion, or by intelligently selecting transmission chains 122 that are not adjacent on the chip/die, the solution presented herein also prevents scenarios where deactivated radio frequency hardware are spatially close on the chip/die, which better distributes the thermal load across the chip/die.

The present disclosure may, of course, be carried out in other ways than those specifically set forth herein without departing from essential characteristics of the disclosure. The present embodiments are to be considered in all respects as illustrative and not restrictive, and all changes coming within the meaning and equivalency range of the appended claims are intended to be embraced therein.

What is claimed is:

1. A method, implemented by a wireless communication device, of selectively controlling transmissions from the wireless communication device, said wireless communication device in communication with an access node of a wireless network, the method comprising:
   receiving a signal at each of a plurality of antenna ports, each antenna port operatively connected to:
     a reception chain comprising a plurality of reception circuits configured to process signals received from the corresponding antenna port; and
     a transmission chain comprising a plurality of transmission circuits configured to generate a signal for transmission from the corresponding antenna port;
   processing each received signal to estimate a rate of change for a channel associated with the corresponding antenna port;
   defining a deactivation subset of antenna ports as comprising the antenna ports of the plurality of antenna ports having a rate of change estimate that satisfies a transmitter rate of change requirement; and
   deactivating each of the transmission chains operatively connected to the antenna ports in the deactivation subset;
   wherein deactivating the transmission chains operatively connected to the antenna ports in the deactivation subset comprises deactivating all active transmission circuits in each transmission chain operatively connected to the antenna ports in the deactivation subset.

2. The method of claim 1 further comprising processing each received signal to estimate a signal quality for each received signal, wherein defining the deactivation subset comprises defining the deactivation subset as comprising the antenna ports in the plurality of antenna ports having a signal quality estimate that fails a signal quality requirement and having a rate of change estimate that satisfies the rate of change requirement.

3. The method of claim 2 wherein defining the deactivation subset comprises:
   defining an initial subset of antenna ports as comprising the antenna ports in the plurality of antenna ports having a signal quality estimate that fails the signal quality requirement; and
   defining the deactivation subset as comprising the antenna ports in the initial subset having a rate of change estimate that satisfies the rate of change requirement.

4. The method of claim 1 further comprising determining a time limit responsive to at least one of the rate of change estimates and a transient time associated with the transmission chains, wherein deactivating the transmission chains comprises deactivating the transmission chains operatively connected to the antenna ports in the deactivation subset for the time limit.

5. The method of claim 1 further comprising defining the deactivation subset as comprising the antenna ports having the rate of change estimates that satisfy the rate of change requirement and that are operatively connected to non-adjacent transmission chains.

6. The method of claim 1 wherein the transmission chains are disposed on a die such that adjacent antenna ports do not operatively connect to adjacent transmission chains on the die.

7. The method of claim 1 further comprising transmitting signals from one or more of the antenna ports not in the deactivation subset.

8. The method of claim 7 wherein transmitting the signals comprises transmitting reference signals from one or more of the antenna ports not in the deactivation subset.

9. The method of claim 7 wherein transmitting the signals comprises transmitting data signals from one or more of the antenna ports not in the deactivation subset.

10. The method of claim 1 further comprising:
    defining a receiver deactivation subset of antenna ports as comprising the antenna ports of the plurality of antenna ports having a rate of change estimate that satisfies a receiver rate of change requirement; and deactivating each of the reception chains operatively connected to the antenna ports in the receiver deactivation subset.

11. The method of claim 10 wherein the receiver rate of change requirement is different from the transmitter rate of change requirement.

12. The method of claim 10 further comprising processing each rate of change for the channel to determine a channel coherence time of the channel associated with the corresponding antenna port, wherein deactivating each of the reception chains operatively connected to the antenna ports in the receiver deactivation subset comprises deactivating each of the reception chains operatively connected to the antenna ports in the receiver deactivation subset for a time duration less than the corresponding channel coherence time.

13. The method of claim 1 wherein the rate of change estimate comprises at least one of a rate of change of a Doppler frequency and a rate of change of movement of the wireless communication device.

14. A computer program product stored in a non-transitory computer readable medium for controlling a wireless communication device to selectively control transmissions from the wireless communication device, said wireless communication device in communication with an access node of a wireless network, the computer program product comprising software instructions which, when run on at least one processing circuit in the wireless communication device, causes the wireless communication device to:
receive a signal at each of a plurality of antenna ports, each antenna port operatively connected to:
a reception chain comprising a plurality of reception circuits configured to process signals received from the corresponding antenna port; and
a transmission chain comprising a plurality of transmission circuits configured to generate a signal for transmission from the corresponding antenna port;
process each received signal to estimate a rate of change for a channel associated with the corresponding antenna port;
define a deactivation subset of antenna ports as comprising the antenna ports of the plurality of antenna ports having a rate of change estimate that satisfies a transmitter rate of change requirement; and
deactivate each of the transmission chains operatively connected to the antenna ports in the deactivation subset;
wherein deactivating the transmission chains operatively connected to the antenna ports in the deactivation subset comprises deactivating all active transmission circuits in each transmission chain operatively connected to the antenna ports in the deactivation subset.

15. A wireless communication device configured to selectively control transmissions from the wireless communication device, said wireless communication device in communication with an access node of a wireless network, the wireless communication device comprising:
a plurality of antenna ports, each antenna port operatively connected to:
a reception chain comprising a plurality of reception circuits configured to process signals received from the corresponding antenna port; and
a transmission chain comprising a plurality of transmission circuits configured to generate a signal for transmission from the corresponding antenna port;
an analysis circuit operatively connected to each reception chain and each transmission chain, the analysis circuit configured to process each signal received by a corresponding antenna port to estimate a rate of change for a channel associated with the corresponding antenna port; and
a deactivation circuit operatively connected to the analysis circuit and to each reception and transmission chain, the deactivation circuit configured to:
define a deactivation subset of antenna ports as comprising the antenna ports of the plurality of antenna ports having a rate of change estimate that satisfies a transmitter rate of change requirement; and
deactivate each of the transmission chains operatively connected to the antenna ports in the deactivation subset;
wherein the deactivation circuit deactivates the transmission chains operatively connected to the antenna ports in the deactivation subset by deactivating all active transmission circuits in each transmission chain operatively connected to the antenna ports in the deactivation subset.

16. The wireless communication device of claim 15 wherein the analysis circuit is further configured to process each received signal to estimate a signal quality for each received signal, and wherein the deactivation circuit defines the deactivation subset by defining the deactivation subset as comprising the antenna ports in the plurality of antenna ports having a signal quality estimate that fails a signal quality requirement and having a rate of change estimate that satisfies the rate of change requirement.

17. The wireless communication device of claim 16 wherein the deactivation circuit defines the deactivation subset by:
defining an initial subset of antenna ports as comprising the antenna ports in the plurality of antenna ports having a signal quality estimate that fails the signal quality requirement; and
defining the deactivation subset as comprising the antenna ports in the initial subset having a rate of change estimate that satisfies the rate of change requirement.

18. The wireless communication device of claim 15 wherein one or more antenna ports not in the deactivating subset are configured to transmit signals.

19. The wireless communication device of claim 18 wherein one or more of the antenna ports not in the deactivation subset transmit the signals by transmitting reference signals.

20. The wireless communication device of claim 18 wherein one or more of the antenna ports not in the deactivation subset transmit the signals by transmitting data signals.

21. The wireless communication device of claim 15 wherein the deactivation circuit is further configured to:
define a receiver deactivation subset of antenna ports as comprising the antenna of the plurality of antenna ports having a rate of change estimate that satisfies a receiver rate of change requirement; and
deactivate each of the reception chains operatively connected to the antenna ports in the receiver deactivation subset.

22. The wireless communication device of claim 21 wherein the receiver rate of change requirement is different from the transmitter rate of change requirement.

23. The wireless communication device of claim 21 wherein the analysis circuit is further configured to process each rate of change for the channel to determine a channel coherence time of the channel associated with the corresponding antenna port, and wherein the deactivation circuit deactivates each of the reception chains operatively connected to the antenna ports in the receiver deactivation subset by deactivating each of the reception chains operatively connected to the antenna ports in the receiver deactivation subset for a time duration less than the corresponding channel coherence time.

24. The wireless communication device of claim 15 wherein the rate of change estimate comprises at least one of a rate of change of a Doppler frequency and a rate of change of movement of the wireless communication device.

25. A method, implemented by a wireless communication device, of selectively controlling transmissions from the wireless communication device, said wireless communication device in communication with an access node of a wireless network, the method comprising:
   receiving a signal at each of a plurality of antenna ports, each antenna port operatively connected to:
      a reception chain comprising a plurality of reception circuits configured to process signals received from the corresponding antenna port; and
      a transmission chain comprising a plurality of transmission circuits configured to generate a signal for transmission from the corresponding antenna port;
   processing each received signal to estimate a rate of change for a channel associated with the corresponding antenna port;
   defining a deactivation subset of antenna ports as comprising the antenna ports of the plurality of antenna ports having a rate of change estimate that satisfies a transmitter rate of change requirement;
   deactivating each of the transmission chains operatively connected to the antenna ports in the deactivation subset; and
   processing each received signal to estimate a signal quality for each received signal, wherein defining the deactivation subset comprises defining the deactivation subset as comprising the antenna ports in the plurality of antenna ports having a signal quality estimate that fails a signal quality requirement and having a rate of change estimate that satisfies the rate of change requirement;
   wherein defining the deactivation subset comprises:
      defining an initial subset of antenna ports as comprising the antenna ports in the plurality of antenna ports having a signal quality estimate that fails the signal quality requirement; and
      defining the deactivation subset as comprising the antenna ports in the initial subset having a rate of change estimate that satisfies the rate of change requirement.

26. The method of claim 25 wherein the signal quality requirement comprises a signal quality threshold and wherein the rate of change requirement comprises a rate of change threshold, and wherein defining the deactivation subset comprises:
   defining the initial subset of antenna ports as comprising the antenna ports in the plurality of antenna ports having a signal quality estimate less than the signal quality threshold; and
   defining the deactivation subset as comprising the antenna ports in the initial subset having a rate of change estimate less than the rate of change threshold.

27. The method of claim 25 wherein deactivating each of the transmission chains operatively connected to the antenna ports in the deactivation subset comprises deactivating at least one of the transmission circuits in each transmission chain operatively connected to the antenna ports in the deactivation subset.

28. The method of claim 25 wherein deactivating the transmission chains operatively connected to the antenna ports in the deactivation subset comprises deactivating the transmission chains operatively connected to the antenna ports in the deactivation subset for a predetermined amount of time.

29. The method of claim 28 further comprising reactivating each transmission chain operatively connected to the antenna ports in the deactivation subset after expiration of the predetermined amount of time.

30. A method, implemented by a wireless communication device, of selectively controlling transmissions from the wireless communication device, said wireless communication device in communication with an access node of a wireless network, the method comprising:
   receiving a signal at each of a plurality of antenna ports, each antenna port operatively connected to:
      a reception chain comprising a plurality of reception circuits configured to process signals received from the corresponding antenna port; and
      a transmission chain comprising a plurality of transmission circuits configured to generate a signal for transmission from the corresponding antenna port;
   processing each received signal to estimate a rate of change for a channel associated with the corresponding antenna port;
   defining a deactivation subset of antenna ports as comprising the antenna ports of the plurality of antenna ports having a rate of change estimate that satisfies a transmitter rate of change requirement;
   deactivating each of the transmission chains operatively connected to the antenna ports in the deactivation subset; and
   determining a time limit responsive to at least one of the rate of change estimates and a transient time associated with the transmission chains, wherein deactivating the transmission chains comprises deactivating the transmission chains operatively connected to the antenna ports in the deactivation subset for the time limit.

31. A wireless communication device configured to selectively control transmissions from the wireless communication device, said wireless communication device in communication with an access node of a wireless network, the wireless communication device comprising:
   a plurality of antenna ports, each antenna port operatively connected to:
      a reception chain comprising a plurality of reception circuits configured to process signals received from the corresponding antenna port; and
      a transmission chain comprising a plurality of transmission circuits configured to generate a signal for transmission from the corresponding antenna port;
   an analysis circuit operatively connected to each reception chain and each transmission chain, the analysis circuit configured to process each signal received by a corresponding antenna port to estimate a rate of change for a channel associated with the corresponding antenna port; and
   a deactivation circuit operatively connected to the analysis circuit and to each reception and transmission chain, the deactivation circuit configured to:
      define a deactivation subset of antenna ports as comprising the antenna ports of the plurality of antenna ports having a rate of change estimate that satisfies a transmitter rate of change requirement; and deactivate each of the transmission chains operatively connected to the antenna ports in the deactivation subset;

wherein the analysis circuit is further configured to process each received signal to estimate a signal quality for each received signal, and wherein the deactivation circuit defines the deactivation subset by defining the deactivation subset as comprising the antenna ports in the plurality of antenna ports having a signal quality estimate that fails a signal quality requirement and having a rate of change estimate that satisfies the rate of change requirement; and wherein the deactivation circuit defines the deactivation subset by:

defining an initial subset of antenna ports as comprising the antenna ports in the plurality of antenna ports having a signal quality estimate that fails the signal quality requirement; and defining the deactivation subset as comprising the antenna ports in the initial subset having a rate of change estimate that satisfies the rate of change requirement.

32. The wireless communication device of claim 31 wherein the signal quality requirement comprises a signal quality threshold and wherein the rate of change requirement comprises a rate of change threshold, and wherein the deactivation circuit defines the deactivation subset by:

defining the initial subset of antenna ports as comprising the antenna ports in the plurality of antenna ports having a signal quality estimate less than the signal quality threshold; and defining the deactivation subset as comprising the antenna ports in the initial subset having a rate of change estimate less than the rate of change threshold.

33. The wireless communication device of claim 31 wherein the deactivation circuit deactivates each of the transmission chains operatively connected to the antenna ports in the deactivation subset by deactivating at least one of the transmission circuits in each transmission chain operatively connected to the antenna ports in the deactivation subset.

34. The wireless communication device of claim 31 wherein the deactivation circuit deactivates the transmission chains operatively connected to the antenna ports in the deactivation subset by deactivating the transmission chains operatively connected to the antenna ports in the deactivation subset for a predetermined amount of time.

35. The wireless communication device of claim 15 further comprising a timing circuit configured to determine a time limit responsive to at least one of the rate of change estimates and a transient time associated with the transmission chains, wherein the deactivation circuit deactivates the transmission chains by deactivating the transmission chains operatively connected to the antenna ports in the deactivation subset for the time limit.

36. The wireless communication device of claim 15 wherein the deactivation circuit is further configured to define the deactivation subset as comprising the antenna ports that are operatively connected to non-adjacent transmission chains.

37. The wireless communication device of claim 15 wherein the transmission chains are disposed on a die such that adjacent transmission chains on the die do not connect to adjacent antenna ports.

38. A wireless communication device configured to selectively control transmissions from the wireless communication device, said wireless communication device in communication with an access node of a wireless network, the wireless communication device comprising:

a plurality of antenna ports, each antenna port operatively connected to:

a reception chain comprising a plurality of reception circuits configured to process signals received from the corresponding antenna port; and a transmission chain comprising a plurality of transmission circuits configured to generate a signal for transmission from the corresponding antenna port;

an analysis circuit operatively connected to each reception chain and each transmission chain, the analysis circuit configured to process each signal received by a corresponding antenna port to estimate a rate of change for a channel associated with the corresponding antenna port; and a deactivation circuit operatively connected to the analysis circuit and to each reception and transmission chain, the deactivation circuit configured to:

define a deactivation subset of antenna ports as comprising the antenna ports of the plurality of antenna ports having a rate of change estimate that satisfies a transmitter rate of change requirement; and deactivate each of the transmission chains operatively connected to the antenna ports in the deactivation subset;

wherein the deactivation circuit deactivates the transmission chains operatively connected to the antenna ports in the deactivation subset by deactivating the transmission chains operatively connected to the antenna ports in the deactivation subset for a predetermined amount of time.

39. The wireless communication device of claim 38 wherein the deactivation circuit is further configured to reactivate each transmission chain operatively connected to the antenna ports in the deactivation subset after expiration of the predetermined amount of time.

40. A wireless communication device configured to selectively control transmissions from the wireless communication device, said wireless communication device in communication with an access node of a wireless network, the wireless communication device comprising:

a plurality of antenna ports, each antenna port operatively connected to:

a reception chain comprising a plurality of reception circuits configured to process signals received from the corresponding antenna port; and a transmission chain comprising a plurality of transmission circuits configured to generate a signal for transmission from the corresponding antenna port;

an analysis circuit operatively connected to each reception chain and each transmission chain, the analysis circuit configured to process each signal received by a corresponding antenna port to estimate a rate of change for a channel associated with the corresponding antenna port;

a deactivation circuit operatively connected to the analysis circuit and to each reception and transmission chain, the deactivation circuit configured to:

define a deactivation subset of antenna ports as comprising the antenna ports of the plurality of antenna ports having a rate of change estimate that satisfies a transmitter rate of change requirement; and deactivate each of the transmission chains operatively connected to the antenna ports in the deactivation subset; and a timing circuit configured to determine a time limit responsive to at least one of the rate of change estimates and a transient time associated with the transmission chains, wherein the deactivation circuit deactivates the transmission chains by deactivating the transmission chains operatively connected to the antenna ports in the deactivation subset for the time limit.

41. A wireless communication device configured to selectively control transmissions from the wireless communication device, said wireless communication device in communication with an access node of a wireless network, the wireless communication device comprising:

a plurality of antenna ports, each antenna port operatively connected to:
  a reception chain comprising a plurality of reception circuits configured to process signals received from the corresponding antenna port; and
  a transmission chain comprising a plurality of transmission circuits configured to generate a signal for transmission from the corresponding antenna port;
an analysis circuit operatively connected to each reception chain and each transmission chain, the analysis circuit configured to process each signal received by a corresponding antenna port to estimate a rate of change for a channel associated with the corresponding antenna port; and
a deactivation circuit operatively connected to the analysis circuit and to each reception and transmission chain, the deactivation circuit configured to:
  define a deactivation subset of antenna ports as comprising the antenna ports of the plurality of antenna ports having a rate of change estimate that satisfies a transmitter rate of change requirement; and
  deactivate each of the transmission chains operatively connected to the antenna ports in the deactivation subset;
wherein the deactivation circuit is further configured to define the deactivation subset as comprising the antenna ports that are operatively connected to non-adjacent transmission chains.

42. A wireless communication device configured to selectively control transmissions from the wireless communication device, said wireless communication device in communication with an access node of a wireless network, the wireless communication device comprising:

a plurality of antenna ports, each antenna port operatively connected to:
  a reception chain comprising a plurality of reception circuits configured to process signals received from the corresponding antenna port; and
  a transmission chain comprising a plurality of transmission circuits configured to generate a signal for transmission from the corresponding antenna port;
an analysis circuit operatively connected to each reception chain and each transmission chain, the analysis circuit configured to process each signal received by a corresponding antenna port to estimate a rate of change for a channel associated with the corresponding antenna port; and
a deactivation circuit operatively connected to the analysis circuit and to each reception and transmission chain, the deactivation circuit configured to:
  define a deactivation subset of antenna ports as comprising the antenna ports of the plurality of antenna ports having a rate of change estimate that satisfies a transmitter rate of change requirement; and
  deactivate each of the transmission chains operatively connected to the antenna ports in the deactivation subset;
wherein the transmission chains are disposed on a die such that adjacent transmission chains on the die do not connect to adjacent antenna ports.

43. A wireless communication device configured to selectively control transmissions from the wireless communication device, said wireless communication device in communication with an access node of a wireless network, the wireless communication device comprising:

a plurality of antenna ports, each antenna port operatively connected to:
  a reception chain comprising a plurality of reception circuits configured to process signals received from the corresponding antenna port; and
  a transmission chain comprising a plurality of transmission circuits configured to generate a signal for transmission from the corresponding antenna port;
an analysis circuit operatively connected to each reception chain and each transmission chain, the analysis circuit configured to process each signal received by a corresponding antenna port to estimate a rate of change for a channel associated with the corresponding antenna port; and
a deactivation circuit operatively connected to the analysis circuit and to each reception and transmission chain, the deactivation circuit configured to:
  define a deactivation subset of antenna ports as comprising the antenna ports of the plurality of antenna ports having a rate of change estimate that satisfies a transmitter rate of change requirement; and
  deactivate each of the transmission chains operatively connected to the antenna ports in the deactivation subset;
wherein the deactivation circuit is further configured to:
  define a receiver deactivation subset of antenna ports as comprising the antenna of the plurality of antenna ports having a rate of change estimate that satisfies a receiver rate of change requirement; and
  deactivate each of the reception chains operatively connected to the antenna ports in the receiver deactivation subset;
wherein the receiver rate of change requirement is different from the transmitter rate of change requirement.

44. A wireless communication device configured to selectively control transmissions from the wireless communication device, said wireless communication device in communication with an access node of a wireless network, the wireless communication device comprising:

a plurality of antenna ports, each antenna port operatively connected to:
  a reception chain comprising a plurality of reception circuits configured to process signals received from the corresponding antenna port; and
  a transmission chain comprising a plurality of transmission circuits configured to generate a signal for transmission from the corresponding antenna port;
an analysis circuit operatively connected to each reception chain and each transmission chain, the analysis circuit configured to process each signal received by a corresponding antenna port to estimate a rate of change for a channel associated with the corresponding antenna port; and a deactivation circuit operatively connected to the analysis circuit and to each reception and transmission chain, the deactivation circuit configured to:
  define a deactivation subset of antenna ports as comprising the antenna ports of the plurality of antenna ports having a rate of change estimate that satisfies a transmitter rate of change requirement; and
  deactivate each of the transmission chains operatively connected to the antenna ports in the deactivation subset;
wherein the deactivation circuit is further configured to:
  define a receiver deactivation subset of antenna ports as comprising the antenna of the plurality of antenna ports having a rate of change estimate that satisfies a receiver rate of change requirement; and
  deactivate each of the reception chains operatively connected to the antenna ports in the receiver deactivation subset; and
wherein the analysis circuit is further configured to process each rate of change for the channel to determine a channel coherence time of the channel associated with the corresponding antenna port, and wherein the deactivation circuit deactivates each of the reception chains operatively connected to the antenna ports in the receiver deactivation subset by deactivating each of the reception chains operatively connected to the antenna ports in the receiver deactivation subset for a time duration less than the corresponding channel coherence time.

* * * * *